United States Patent [19]

Hegedus et al.

[11] 4,431,681

[45] Feb. 14, 1984

[54] PROCESS FOR PREPARING A HIGH QUALITY, REDUCED-CALORIE CAKE

[75] Inventors: Elizabeth Hegedus, Tarrytown; John R. Frost, Beacon; Martin Glicksman, Valley Cottage, all of N.Y.; Jerry E. Silverman, Hamilton Square, N.J.

[73] Assignee: General Foods Corporation, White Plains, N.Y.

[21] Appl. No.: 355,404

[22] Filed: Mar. 8, 1982

[51] Int. Cl.$^3$ ............................................ A21D 13/08
[52] U.S. Cl. ...................................... 426/553; 426/804
[58] Field of Search ................................ 426/551–555, 426/804

[56] References Cited

U.S. PATENT DOCUMENTS

| | | | |
|---|---|---|---|
| 3,574,634 | 4/1971 | Singer | 99/83 |
| 3,676,150 | 7/1972 | Glicksman et al. | 99/90 |
| 4,109,018 | 8/1978 | Thompson | 426/62 |
| 4,219,580 | 8/1980 | Torres | 426/549 |
| 4,275,088 | 6/1981 | Hart et al. | 426/554 |

OTHER PUBLICATIONS

Brochure: "Nature's Own Ingredient... Solka-Floc$^R$".

*Primary Examiner*—Raymond N. Jones
*Assistant Examiner*—Elizabeth A. Hatcher
*Attorney, Agent, or Firm*—Thomas A. Marcoux; Thomas R. Savoie; Daniel J. Donovan

[57] ABSTRACT

A process is disclosed for producing a high quality, 40% or greater calorie-reduced cake containing a moisture content of 40% or more on an as-consumed basis. The process involves preparing a batter formulation comprising from 40% to 65% water on a by weight basis, 5 to 30% cake flour, 0 to 25% sugar, 1 to 6% shortening, 0 to 10% egg white solids, 0.5 to 6% of a leavening agent, 0 to 2% of an emulsifier and 1 to 20% of a water binder which is either a gum, bulking agent or combination, adjusting the batter viscosity within the range of from 15,000 to 50,000 cps. as measured by a Brookfield Viscometer and baking at a temperature of from 300° F.–450° F. (149°–232° C.) for a time sufficient to produce a bake loss of from 5 to 20%.

11 Claims, No Drawings

PROCESS FOR PREPARING A HIGH QUALITY, REDUCED-CALORIE CAKE

TECHNICAL FIELD

This invention relates to reduced calorie foodstuffs and in particular to the production of a greater than 40% calorie-reduced cake of high quality containing at least 40% or more water due to the incorporation of gums, bulking agents or combinations thereof.

BACKGROUND ART

For centuries people have been weight conscious and have been striving to maintain diets that will enable them to control their weight. In the past few years research efforts in the low-calorie food area have been greatly accelerated by medical reports disclosing the fact that a great many people in the United States are overweight and the adverse consequences associated therewith. Recent research efforts in the food art have been directed primarily to the production of baked goods that would satisfy one's appetite but will not increase one's caloric intake, e.g., materials that will have bulk but which are not digested by human beings. Examples of such foods are those that contain low-calorie bulk fillers, gums or combination of gums and fillers.

U.S. Pat. No. 3,676,150 entitled Low Calorie Yeast Leavened Baked Products issued to Glicksman et al. teaches the production of low-calorie, yeast-leavened baked products, specifically a bread which contains 50% or less of the calories normally contained by a conventional bread. This reduction in calories is attributable to the flour which is used in this recipe. The invention is predicated on the use of three materials in specific proportions to constitute a gluten-free flour which will emulate the properties of wheat flour. The flour contains from 1-10% of a cellulosic gum by weight of the flour, a starch component, preferably wheat starch of from 30-70% by weight and alpha-cellulose from 30-70% by weight. The finished baked product has a moisture content from 50-60%.

U.S. Pat. No. 4,109,018 entitled Low Calorie Diet Bread issued to Thompson teaches the production of a low-calorie bread containing wheat gluten, protein, alpha-cellulose, and a hydrophilic gum. The presence of the gum results in extra water retention whereby the dough contains 76% water.

U.S. Pat. No. 4,219,580 entitled Flour Substitutes issued to Torres teaches a method of extending flour whereby up to 70% of the flour is replaced by the substitute flour of the invention yielding a caloric reduction of up to 35%. The substitute flour consists of cellulose, xanthan gum and an emulsifier.

U.S. Pat. No. 3,574,634 entitled Low Calorie Foodstuffs issued to Singer teaches a low-calorie synthetic foodstuff, namely a dough, containing less than 10 or 15% by weight of assimilable carbohydrate and consisting essentially of vital gluten, a non-nutritive edible filler, preferably a cellulosic material, a vegetable gum and water. The dough produced according to the invention will contain a flour component of 50 parts by weight, an inert filler of from 10 to 50 parts by weight, a vegetable gum of from 1 to 10 parts by weight and water at 50 to 100 parts by weight. The caloric content of a typical synthetic bread produced according to the Singer invention will be greater than 50% calorie reduced when compared to a conventional bread.

The key to making a low-calorie baked product is to dilute the recipe with a low/non caloric ingredient (bulk filler, water, etc.), yet, maintain the structure and texture of the full-calorie counterpart. With the exception of the Torres patent, all of the previously mentioned patents disclose a process or a composition for forming a dough to prepare a bread. Cake and bread, although, apparently similar baked goods, depend on two entirely different mechanisms to achieve their respective product structures and textures. Bread is a yeast-leavened system whose matrix is developed by mechanically "working" a wheat flour protein (gluten). The critical consideration in bread is the continuity of the gluten network. When a low-calorie bread is attempted, the calorie reducing dilutant must not interrupt the gluten network and must also be compatable with the living yeast.

Cake is a chemically-leavened system whose matrix is a foam. This foam has the batter as the lamella and a combination of air (from mixing) and carbon dioxide from the baking soda/powder as the gaseous phase. The critical considerations in cake are the surface energy and flow characteristics of the batter. The calorie reducing dilutant must not hinder the lamella forming ability of the batter or an uneven foam structure (or no foam structure) will result.

The present inventors compared cakes made according to their process containing their level of ingredients versus cakes embodying the Torres patent. They found that the examples in the Torres patent produced cakes which were less than 25% calorie-reduced and which contained less than 25% water in the cake as consumed. The Torres cakes were perceived to be excessively dry. Cakes made according to the present invention however were greater than 40% calorie-reduced and while they contained 40% of more water on an as-consumed basis, the cakes had a good overall taste perception, one which was not perceived to be overly moist.

Accordingly, it is an object of the present invention to provide a low-calorie cake having a reduction in the caloric content of 40% or more and a moisture content of 40% or more. It is another object of the invention to provide a low-calorie cake which although contains a high amount of moisture, is not perceived to be excessively moist and which provides desirable texture and structure in the finished cake product.

DISCLOSURE OF THE INVENTION

The invention relates to a process for producing a high quality 40% or greater reduced calorie cake which contains 40% or more water on an as-consumed basis due to the presence of water binders which may consist of gums, bulk fillers, or combinations thereof. A caloric reduction of greater than 40% corresponds to a cake which on an as-consumed basis will contain less than 2 calories per gram. Preferably the caloric reduction will be 50% or greater. The batter formulation (prebaked) contains the following ingredients expressed in a broad range and in a preferred range on a by weight total basis of the batter formulation:

TABLE I

| Ingredient | Broad Range (%) | Preferred Range (%) |
|---|---|---|
| Water | 40-65 | 45-60 |
| Cake Flour | 5-30 | 9-25 |
| Sugar | 0-25 | 8-20 |
| Shortening | 1-6 | 1-5 |
| Egg White Solids | 0-10 | 1-6 |
| Leavening Agent | 0.5-6 | 1.0-5 |

TABLE I-continued

| Ingredient | Broad Range (%) | Preferred Range (%) |
|---|---|---|
| Emulsifier | 0–2 | 0.1–2 |
| Water Binder | 1–20 | 1–15 |

The process involves preparing a batter formulation containing from 40–65% water on a by weight basis, 5–30% cake flour, 0–25% sugar, 1–6% shortening, 0–10% egg white solids, 0.5–6% of a leavening agent, 0–2% of an emulsifier and 1–20% of a water binder which can consist of a bulking agent, gum or combination, adjusting the viscosity of said batter formulation until it falls within the range of 15,000 to 50,000 cps. as measured by a Brookfield Viscometer and baking said batter formulation at a temperature within the range of from 300°–450° F., (149°–232° C.) preferably 325°–375° F. (163°–191° C.) until the bake loss ranges from 5 to 20%. Within the temperature range it will generally take from 10 minutes to 60 minutes, preferably 30 to 40 minutes, to produce such a bake loss. Preferably the batter formulation will be comprised of the above mentioned ingredients in the more narrow preferred ranges as set out previously in Table I. The preferred bake loss will vary from 8–12%.

The key parameter in the production of a good quality cake is the attainment of a batter viscosity within the range of from 15,000 to 50,000 cps, preferably from 20,000 to 30,000 cps, as measured by a Brookfield Model HAT Viscometer using T-bar B (36 mm.) at 5 rpm. The type of gum or bulking agent or combination used is selected in order to keep or maintain the batter viscosity within the critical range. This result is surprising because when bulking agents or gums are used as replacement for flour, fat, or sugar, the bulking agents or gums, because of their lack of solubility, swellability or functionality, tend to settle and not hydrate satisfactorily to the extent of the ingredients they replace. While it has been known that a bulking agent in combination with a gum can reproduce the functionality of the replaced ingredients, it had been difficult to uniformly produce a cake product which possessed a height, structure, and appearance comparable to the conventional product containing the high-caloric ingredients. Therefore, a single key parameter can be monitored, modified, and controlled to give good quality, reduced-calorie cakes which are consistently of high quality.

If after the previous stated percentages of ingredients are mixed together, the batter formulation falls outside the 15,000 cps to 50,000 cps range as measured by the Brookfield Viscometer, an adjustment must be made in order to achieve a finished baked product of excellent texture and height. Additionally, should one wish to optimize conditions and fall within the 20,000 to 30,000 cps preferred range, it is possible to adjust the batter formulation even if before the adjustment it falls within the broader 15,000 to 50,000 cps range. Should the viscosity measurement fall below 15,000 cps or should one desire to further increase viscosity within the range, this can be achieved by adding an additional amount of a water binder sufficient either to adjust the viscosity within the broad 15,000 to 50,000 cps. range or to optimize viscosity within a more preferred range. Even after the additional amount of water binder is added, the total amount of water binder will fall with the aforementioned 1–20% by weight of the batter formulation (prebaked). In a similar manner if the viscosity of the batter formulation exceeds 50,000 cps., or if one wishes to optimize the batter viscosity by decreasing it to a more narrow preferred range, an additional amount of water can be added sufficient to either bring the viscosity within the 15,000 to 50,000 cps. range or within the preferred range. After the additional amount of water is added the total amount of water will still fall within the range of 40 to 65% by weight of the batter formulation (prebaked).

A novel feature of the low calorie cake of the present invention is that even though it contains 40% or more water on an as-consumed basis it is perceived of as being somewhat "dry" and it is not perceived to be excessively moist, or gummy. Additionally, the cake product does not possess gritty mouthfeel as was characteristic of cellulose cakes made in the past.

The high-quality, reduced-calorie cake contains a water binder which is defined for purposes of this invention as any substance that will adsorb and tightly hold water, decreasing its mobility, rate of vaporization, and ability to support microbial growth. The water binder can comprise a gum, mixtures of gum, bulking agents, mixtures of bulking agents, or combinations of gums and bulking agents. Good quality cakes have been made from the following gums: carrageenan, guar, gum arabic, locust bean gum, tragacanth, karaya, hydroxypropylcellulose, methylcellulose, Carboxymethylcellulose, xanthan, pectin, alginate, agar and similar hydrocolloids. Suitable bulking agents include: cellulose flour, citrus albedo, sugar beet pulp, pineapple core, bran, sugar cane pulp, soy fiber concentrate, polydextrose, etc.

Citrus albedo, sugar cane pulp, sugar beet pulp, and pineapple core bulking agents are preferably prepared by a process which involves reducing the size of the starting material to prepare particles or slices less than ½inch, water washing to remove soluble carbohydrates, alcoholic extraction of color and bitter consituents preferably using isopropol alcohol, desolventizing and drying and finally milling to the consistency of flour. The other bulk fillers, cellulose flour, soy fiber concentrate, bran and polydextrose are commercially available products.

For purposes of this invention, leavening agent is defined as a substance or substances used to cause gas permeation throughout a batter or dough, thereby, lightening and raising the batter or dough and its subsequent product. Examples of leavening agents include sodium bicarbonate (baking soda) and sodium aluminum phosphate (Levair - Stauffer Chemical Co.).

An emulsifier is defined as surface active agent that causes the integral, uniform mixing of the fat and water components of a batter or dough. The emulsifier also lowers the surface tension of the batter allowing for greater gas incorporation. Examples of suitable emulsifiers include polyoxyethelene (20) sorbitan mono-oleate (Tween 80 - ICI Americas Inc.), sodium stearyl-2-lactylate (Emplex - Patco), and mono and diglycerides.

The batter may also contain optional ingredients such as salt, vanillin, non-fat milk solids, flavor, color, etc. The combined level of these ingredients will be below 15% of the batter on a by weight basis, preferably below 5%. This invention is further illustrated but not limited by the following examples:

EXAMPLE 1

The following formulation was used to make a 50% calorie-reduced cake utilizing cellulose flour as the bulking agent in combination with a gum.

| Ingredient | Amount (gms.) |
| --- | --- |
| Sugar | 90 |
| Cake Flour | 70 |
| Cellulose Flour (Keycel BH-200) | 40 |
| Egg White Solids | 30 |
| Shortening | 16 |
| Baking Soda | 10 |
| Sodium Aluminum Phosphate (Levair - Stauffer Chemical Co.) | 10 |
| Carrageenan | 7.5 |
| Sodium Stearyl-2-lactylate (Emplex - Patco) | 2.0 |
| Salt | 1.3 |
| Polyoxyethelene (20) sorbitan mono-oleate (Tween 80-ICI Americas Inc.) | 1.0 |
| Water | 330 |
| | 607.8 |

The sugar and shortening were creamed together in a Mixmaster bowl. Cake flour, cellulose flour, egg white solids, salt and Emplex were dry blended and then added to the Mixmaster bowl and blended in. The Tween 80 was dissolved in the water and added to the batter mix. The caarageenan, Levair, and baking soda were dry blended and added to the Mixmaster bowl and blended into the batter. Blending in the Mixmaster was continued for five minutes at the highest speed. The viscosity was measured on the Brookfield and determined to be 30,000 cps. Then 500 grams of the batter was poured into a lined and coated 8 inch baking pan and baked at 350° F. (177° C.) for 40 minutes resulting in a 10% bake loss. The resulting cake had a good height, structure, texture and appearance and was of excellent overall quality. The finished cake was 50% calorie-reduced and had a moisutre content of 49% on an as-consumed basis. The finished cake had a calorie value of 1.87 calories/gram as compared to conventional white cake with 3.75 Calories/gram (U.S.D.A. Handbook #8).

EXAMPLE 2

The following formulation was used to make a 50% calorie-reduced cake utilizing orange albedo bulking agent without the incorporation of a gum.

| Ingredient | Amount (gms.) |
| --- | --- |
| Cake Flour | 100 |
| Sugar | 90 |
| Shortening | 20 |
| Egg White Solids | 20 |
| Orange Albedo Bulking Agent | 20 |
| Baking Soda | 6 |
| Sodium Aluminum Phosphate (Levair - Stauffer Chemical Co.) | 6 |
| Non Fat Milk Solids | 5 |
| Sodium Stearyl-2-lactylate (Emplex - Patco) | 4 |
| Salt | 1 |
| Polyoxyethelene (20) sorbitan mono-oleate (Tween 80 - ICI Americas Inc.) | 1 |
| Water | 310 |
| | 583 |

The ingredients were blended together in a similar manner as discussed in Example 1. The viscosity after blending was 25,000 cps. Then 500 grams of the batter was poured into a lined and coated 8 inch baking pan and baked at 350° F. (177° C.) for 40 minutes resulting in a 10% bake loss. The resulting cake had a good height, structure, texture and appearance and was of excellent overall quality. The cake on an as-consumed basis had a moisture content of 48% but was not perceived to be overly "wet" or "gummy" in texture or consistency. The finished cake had a caloric value of 1.87 calories/gram as compared to conventional white cake with 3.75 calories/gram (U.S.D.A. Handbook #8).

EXAMPLE 3

The following formulation was used to make a 50% calorie-reduced cake utilizing a gum only as the single water-binder.

| Ingredient | Amount (gms.) |
| --- | --- |
| Sugar | 100 |
| Cake Flour | 100 |
| Shortening | 20 |
| Low Methoxyl Pectin (Hercules) | 18 |
| Egg White Solids | 13 |
| Baking Soda | 6 |
| Sodium Aluminum Phosphate (Levair - Stauffer Chemical Co.) | 6 |
| Sodium Stearyl-2-lactylate (Emplex - Patco) | 4 |
| Salt | 1 |
| Polyoxyethelene (20) sorbitan mono-oleate (Tween 80 - ICI Americas, Inc.) | 1 |
| Water | 310 |
| | 579 |

The process for making the cake was similar to that discussed in Examples 1 and 2. The viscosity after the blending of the ingredients was measured at 25,000 cps. The batter was poured into baking pans and baked at 350° F. (177° C.) for 40 minutes resulting in a 10% bake loss. The cake on an as consumed basis had a moisture content of 48% and was of excellent overall quality. The finished cake had a caloric value of 1.87 calories/gram as compared to conventional white cake with 3.75 calories/gram (U.S.D.A. Handbook #8).

We claim:

1. A process for producing a high quality, 40% or greater calorie-reduced cake, with a moisture content of at least 40% which comprises:

preparing a batter formulation, said batter formulation comprising from 40 to 65% water on a by weight basis, 5 to 30 % cake flour, 0 to 25% sugar, 1 to 6% shortening, 0 to 10% egg white solids, 0.5 to 6% of a leavening agent, 0 to 2% of an emulsifier and 1 to 20% of a water binder;

adjusting said batter formulation to fall within the range of 15,000 to 50,000 cps. as measured by a Brookfield Viscometer; and baking said adjusted batter formulation at a temperature within the range of from 300°–450° F. (149°–232° C.) for 10 to 60 minutes sufficient to produce a bake loss ranging from 5 to 20%.

2. The process according to claim 1 wherein the viscosity adjustment is obtained by adding an additional amount of water binder.

3. The process according to claim 1 wherein the viscosity adjustment is obtained by adding an additional amount of water.

4. The process according to claim 1 wherein said batter formulation comprises from 45 to 60% water, 9 to 25% cake flour, 8 to 20% sugar, 1 to 5% shortening, 1 to 6% egg white solids, 1.0 to 5.0% of a leavening agent and 0.1 to 2.0% of an emulsifier and 1 to 15% of a water binder.

5. The process according to claim 1 or 4 wherein the water binder is a gum.

6. The process of claim 5 wherein the gum is selected from the group consisting of carrageenan, guar, gum arabic, locust bean gum, traganth, karaya, hydroxypropylcellulose, methylcellulose, carboxymethylcellulose, xanthan, pectin, alginates and agar.

7. The process according to claims 1 or 4 wherein the water binder is a bulking agent.

8. The process according to claim 7 wherein the bulking agent is selected from the group consisting of citrus albedo, cellulose flour, sugar beet pulp, pineapple core, bran, sugar cane pulp, bran and polydextrose.

9. The process according to claims 1 or 4 wherein the water binder is a combination of bulking agents and gums.

10. The process according to claim 1 wherein the adjusted batter formulation is baked at a temperature within the range of from 325°–375° F. (163°–191° C.) for 30 to 40 minutes thereby producing a bake loss of 8–12%.

11. The process according to claim 1 wherein the adjusted batter formulation falls within the range of 20,000 to 30,000 cps.

* * * * *